US012559183B2

(12) United States Patent
Ikuhara et al.

(10) Patent No.: US 12,559,183 B2
(45) Date of Patent: Feb. 24, 2026

(54) VEHICLE FRONT PART STRUCTURE

(71) Applicant: TOYOTA JIDOSHA KABUSHIKI KAISHA, Aichi-ken (JP)

(72) Inventors: Naoki Ikuhara, Toyokawa (JP);
Hideyuki Takahashi, Nisshin (JP);
Shin Nakahara, Nisshin (JP);
Takahiko Satoh, Anjo (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 435 days.

(21) Appl. No.: 18/366,616

(22) Filed: Aug. 7, 2023

(65) Prior Publication Data

US 2024/0051624 A1      Feb. 15, 2024

(30) Foreign Application Priority Data

Aug. 10, 2022      (JP) ................................. 2022-127604

(51) Int. Cl.
| | |
|---|---|
| *B62D 35/02* | (2006.01) |
| *B60L 50/60* | (2019.01) |
| *B62D 21/06* | (2006.01) |
| *B62D 25/20* | (2006.01) |
| *H01M 50/242* | (2021.01) |
| *H01M 50/249* | (2021.01) |

(52) U.S. Cl.
CPC .............. *B62D 35/02* (2013.01); *B60L 50/66* (2019.02); *B62D 21/06* (2013.01); *B62D 25/2072* (2013.01); *H01M 50/242* (2021.01); *H01M 50/249* (2021.01); *H01M 2220/20* (2013.01)

(58) Field of Classification Search
CPC ..................... B62D 21/06; B62D 35/02; B60K 2001/0438; H01M 2220/20
See application file for complete search history.

(56) References Cited

U.S. PATENT DOCUMENTS

| | | | | |
|---|---|---|---|---|
| 5,555,950 | A | * | 9/1996 | Harada ............... H01M 50/209 180/68.5 |
| 6,227,322 | B1 | * | 5/2001 | Nishikawa .............. B60R 16/04 180/68.5 |
| 8,689,919 | B2 | * | 4/2014 | Maeda ..................... B60K 1/04 180/311 |

(Continued)

FOREIGN PATENT DOCUMENTS

| | | |
|---|---|---|
| JP | 2013237412 A | 11/2013 |
| JP | 2015186960 A | 10/2015 |

*Primary Examiner* — Jeffrey J Restifo
(74) *Attorney, Agent, or Firm* — HAUPTMAN HAM, LLP

(57) ABSTRACT

On the first diagonal, the member is arranged in cooperation with the subframe and the undercover. Further, the cover front-side connection portion and the cover rear-side connection portion are located on or near the first diagonal line. Further, the undercover is provided with a reinforcing portion extending on a second diagonal line which is a diagonal line of a quadrangle having a cover front side connecting portion and a cover rear side connecting portion as a top portion. Therefore, the rigidity of the frame front connecting portion can be increased. In this structure, since it is not necessary to provide an additional component different from the undercover, it is possible to eliminate an increase in the number of components due to the additional component and an occupation of space due to the additional component.

5 Claims, 6 Drawing Sheets

(56) References Cited

U.S. PATENT DOCUMENTS

| | | | | |
|---|---|---|---|---|
| 8,708,402 | B2 * | 4/2014 | Saeki | B62D 21/157 |
| | | | | 180/68.5 |
| 9,281,505 | B2 * | 3/2016 | Hihara | B62D 25/20 |
| 9,533,631 | B2 * | 1/2017 | Kamimura | H01M 50/249 |
| 9,873,456 | B2 * | 1/2018 | Hara | B60K 1/04 |
| 9,956,859 | B2 * | 5/2018 | Ikeda | H01M 8/2465 |
| 10,230,083 | B2 * | 3/2019 | Maguire | B60L 50/64 |
| 10,399,425 | B2 * | 9/2019 | Okamura | B62D 21/02 |
| 10,431,791 | B2 * | 10/2019 | Lomax | H01M 50/24 |
| 10,700,320 | B2 * | 6/2020 | Kosaki | H02J 7/00 |
| 10,710,638 | B2 * | 7/2020 | Kawase | B60K 1/04 |
| 10,752,292 | B2 * | 8/2020 | Kawase | B62D 21/157 |
| 11,034,229 | B2 * | 6/2021 | Kosuge | B60L 50/64 |
| 11,299,205 | B2 * | 4/2022 | Saje | B62D 27/06 |
| 11,491,867 | B2 * | 11/2022 | Cragel | C09D 175/02 |
| 11,548,553 | B2 * | 1/2023 | Ajisaka | B62D 21/157 |
| 11,569,544 | B2 * | 1/2023 | Okada | H01M 50/35 |
| 11,637,346 | B2 * | 4/2023 | Kaita | H01M 50/249 |
| | | | | 180/68.5 |
| 12,046,766 | B2 * | 7/2024 | Hashimoto | B60K 1/04 |
| 12,115,845 | B2 * | 10/2024 | Wiemann | B60K 1/04 |
| 12,128,751 | B2 * | 10/2024 | Koshino | B62D 21/155 |
| 12,347,881 | B2 * | 7/2025 | Naruke | H01M 50/204 |
| 2012/0251862 | A1 * | 10/2012 | Kano | B60L 50/51 |
| | | | | 429/99 |
| 2013/0045398 | A1 * | 2/2013 | Katano | B60L 50/72 |
| | | | | 429/7 |
| 2013/0075173 | A1 * | 3/2013 | Kato | H01M 50/242 |
| | | | | 180/68.5 |
| 2014/0284125 | A1 * | 9/2014 | Katayama | B60L 58/21 |
| | | | | 180/68.5 |
| 2015/0249240 | A1 * | 9/2015 | Hihara | H01M 8/2475 |
| | | | | 180/68.5 |
| 2017/0331086 | A1 * | 11/2017 | Frehn | H01M 50/224 |
| 2017/0368959 | A1 * | 12/2017 | Hara | H01M 50/242 |
| 2019/0322164 | A1 * | 10/2019 | Sasaki | B62D 21/155 |
| 2024/0025486 | A1 * | 1/2024 | Watanabe | B60K 15/07 |
| 2024/0051624 | A1 * | 2/2024 | Ikuhara | H01M 50/249 |
| 2024/0313324 | A1 * | 9/2024 | Hofer | H01M 10/613 |
| 2025/0214409 | A1 * | 7/2025 | Haefner | H01M 10/6568 |

* cited by examiner

VEHICLE FRONT PART STRUCTURE

CROSS-REFERENCE TO RELATED APPLICATION

This application claims priority to Japanese Patent Application No. 2022-127604 filed on Aug. 10, 2022, incorporated herein by reference in its entirety.

BACKGROUND

1. Technical Field

The present disclosure relates to a vehicle front part structure in which an undercover for rectifying an air flow below a vehicle body is disposed at a rear portion of a front subframe (suspension member).

2. Description of Related Art

In order to improve fuel efficiency and electric power consumption for carbon neutrality, weight reduction of the body that occupies most of the vehicle weight is the key. Conventionally, as main means of weight reduction of the body, a method of increasing strength and thinning a plate material of a frame member or a floor panel has been used. However, when the plate is thinned, a dashboard, a floor panel, and an upper body panel, which serve as sound generating portions, tend to vibrate in response to vibration caused by road noise or the like, and noise vibration (NV) performance deteriorates. This contrary relationship was a constraint in further advancing the weight reduction.

This road noise is transmitted from the tire to the knuckle carrier/lower arm, from the knuckle carrier/lower arm to the subframe, from the subframe to the body skeleton, and from the body skeleton to the floor panel (sound generating portion). Conventionally, since a subframe receives a large input from a suspension, the subframe is often coupled to a main skeleton of a body, but in this case, there is a backlash that vibration is easily transmitted from the subframe to the body skeleton.

In view of this, it is conceivable to adopt a structure in which the vibration transmitted from the tire is difficult to be transmitted to the floor panel or the like by coupling the body fastening point on the rear side of the front subframe to the relatively soft portion under the tunnel, rather than to the hard body main skeleton. However, there is a backlash in this configuration that, while the NV is improved, since the fastening point of the subframe is provided in the soft portion, the rigidity of the lower arm at the force application point is lowered, and the steering stability is greatly deteriorated. For this reason, even if the above configuration can be adopted in sport-utility vehicles (SUVs) for emerging countries or in low-priced markets, an issue remains in widely adopting the configuration to vehicles including vehicles that require higher steering stability.

As described above, in order to reduce the thickness of the panel in order to effectively improve the fuel consumption and the electric power consumption by weight reduction, it is necessary to reduce the vibration transmission of the road noise. In order to apply this technology to a wide range of vehicle types while securing high steering stability, a technology to increase the rigidity of the force application point of the subframe while reducing vibration transmission is the key.

Japanese Unexamined Patent Application Publication No. 2015-186960 (JP 2015-186960 A) and Japanese Unexamined Patent Application Publication No. 2013-237412 (JP 2013-237412 A) disclose a method for increasing the rigidity of the force application point of a subframe while reducing (or maintaining) vibration transmission.

JP 2015-186960 A uses a method of coupling an undercover, having a skeleton in the vehicle width direction, at the rear portion of the U-shaped subframe, which is structurally weak without a member of the subframe, and directly connecting the undercover with the connecting member that is coupled to the body. The fastening point of the connecting member is arranged to be able to efficiently receive an input from the vehicle front-side fastening point of the lower arm. However, since a reinforcing member that forms a closed cross-sectional structure with the undercover is provided at the rear portion and the upper portion of the undercover, the number of components increases, and an increase in cost and an increase in mass are inevitable. In addition, in order to improve the rigidity, it is assumed that a connecting member to be fastened to the body is utilized, and therefore, an increase in the number of components, an increase in cost, and an increase in mass are inevitable. Further, in the structure of the connecting member, it is necessary to fasten the connecting member and the subframe together and to fasten the undercover, and thus the number of fastening points (assembly cost) increases. Furthermore, a restriction (a skeleton needs to be disposed at a corresponding position) is also created in the body-side structure with respect to the fastening position of the connecting member on the body side.

JP 2013-237412 A adopts a method of adding a brace having an L-shaped cross section and extending in the vehicle width direction to the rear of the subframe. However, since this structure adds a brace, the number of components increases, and an increase in cost and an increase in mass are inevitable. In addition, when an undercover set for improving aerodynamic performance with the aim of extending a cruising distance is provided, there is a possibility of space interference with the undercover. Further, when the undercover is used as a sound absorbing base material or when the sound absorbing material is attached to the undercover in order to reduce noise, there is a possibility of space interference with the base material thickness and the sound absorbing material. In particular, in a battery electric vehicle (BEV), a high-voltage component such as a connector of a battery is often disposed at a position through which the brace extends, and there is a possibility of space interference with a plate-shaped protective cover for protecting the high-voltage connector from road surface interference.

SUMMARY

It is an object of the present disclosure to provide a vehicle front part structure capable of securing NV performance and rigidity at a force application point of a subframe, while eliminating an increase in the number of components and occupancy of spaces due to additional components.

The present disclosure that achieves the above object is as follows.

(1) First and Second Embodiments

A vehicle front part structure includes: a subframe including right and left frame front side connecting portions connected to right and left lower arms, and right and left frame rear side connecting portions located on a vehicle body rear side from the frame front side connecting portions and connected to a shell body; and an undercover disposed at a rear part of the subframe. The undercover includes right and left cover front side connecting portions connected to the subframe, and right and left cover rear side connecting portions located on the vehicle body rear side from the cover front side connecting portions and connected to a battery fixedly attached to the subframe, the shell body, or a corresponding shell body. When viewed from a bottom, the undercover is provided including an area on a first diagonal line that is a longer diagonal line among a diagonal line of a quadrangle with the frame front side connecting portions and the frame rear side connecting portions as vertices and a diagonal line of a quadrangle with the frame front side connecting portions and the cover rear side connecting portions as vertices. The cover front side connecting portions and the cover rear side connecting portions are located on the first diagonal line or in a vicinity of the first diagonal line. The undercover is provided with a reinforcing portion extending on a second diagonal line that is a diagonal line of a quadrangle with the cover front side connecting portions and the cover rear side connecting portions as vertices.

(2) First and Second Embodiments

In the vehicle front part structure described in (1), in the area on the first diagonal line, there are an area portion in which the subframe is provided and an area portion in which the subframe is not provided, and the undercover is provided including the area portion in which the subframe is not provided.

(3) First and Second Embodiments

In the Vehicle Front Part Structure Described in (1), the Undercover is a One-Piece configuration, and the reinforcing portion is composed of a bead provided in the undercover.

(4) First Embodiment

In the vehicle front part structure described in (1), the shell body includes a floor panel provided with a tunnel portion extending in a vehicle body front-rear direction at a center portion in a vehicle body width direction, and right and left underreinforcements that extends in the vehicle body front-rear direction at both right and left outer sides of the tunnel portion and that is disposed on a lower side of the floor panel to provide a closed cross-sectional structure with the floor panel to provide a main skeleton of the shell body. Among the frame rear side connecting portions and the cover rear side connecting portions, connecting portions on the first diagonal line are connected to the shell body at a position on right and left sides of the tunnel portion and on a center side in the vehicle body width direction from the right and left underreinforcements, while avoiding a portion providing a skeleton of the shell body.

(5) Second Embodiment

In the vehicle front part structure described in (1), the shell body includes a floor panel, the battery is disposed below the floor panel, and the cover rear side connecting portions are connected to the battery.

According to the vehicle front part structure of (1) or (2) describe above, the following effects can be obtained. In order to increase the rigidity of the frame front side connecting portions (the force application point of the subframe) with respect to the large input from the lower arm, (a)

it is desirable that a member is disposed obliquely on the first diagonal line. In addition, it is desirable that (b) the cover front side connecting portions and the cover rear side connecting portions are set on the first diagonal line. Furthermore, it is desirable that (c) the undercover is reinforced on the diagonal line connecting the cover front side connecting portions and the cover rear side connecting portions. In the present disclosure, since the undercover is provided below this with the undercover including the area on the first diagonal line in the bottom view, the member can be disposed in cooperation with the subframe and the undercover on the first diagonal line. Further, the cover front side connecting portions and the cover rear side connecting portions are located on the first diagonal line or in the vicinity of the first diagonal line. Furthermore, the undercover is provided with the reinforcing portion extending on the second diagonal line that is a diagonal line of a quadrangle with the cover front side connecting portions and the cover rear side connecting portions as vertices. Therefore, the rigidity of the frame front side connecting portions can be increased. In this structure, unlike the conventional structure, since it is not necessary to provide an additional component different from the undercover, it is possible to eliminate an increase in the number of components due to the additional component and an occupation of space due to the additional component.

According to the vehicle front part structure of the above (3), since the undercover is a one-piece configuration, the number of components can be reduced as compared with a case where the undercover is a multiple-piece configuration. Further, since the reinforcing portion is composed of a bead provided in the undercover, the reinforcing portion can be easily provided without requiring a separate component.

According to the vehicle front part structure of the above (4), among the frame rear side connecting portions and the cover rear side connecting portions, the connecting portions on the first diagonal line are connected to the shell body at a position on the center side in the vehicle body width direction from the right and left underreinforcements on the right and left sides of the tunnel portion, avoiding a portion forming the skeleton of the shell body. Thus, the connecting portions are connected to a portion that is softer than a portion forming the hard main skeleton of the shell body such as underreinforcements. This makes it difficult for the vibration of the road noise transmitted from the tire to be transmitted to the floor panel, which is advantageous in terms of NV performance.

According to the vehicle front part structure of the above (5), since the cover rear side connecting portions are connected to the battery, the vehicle body front of the battery can be covered with the undercover from below. Therefore, in a battery electric vehicle (BEV) and a plug-in hybrid electric vehicle (PHEV) in which the battery is mounted, the connector provided in the vehicle body front of the battery can be protected from fallen objects on the road surface by the undercover provided for improving aerodynamic properties. In this structure, a battery connector protection plate provided only for protecting the connector is not required, and the number of components can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 11:
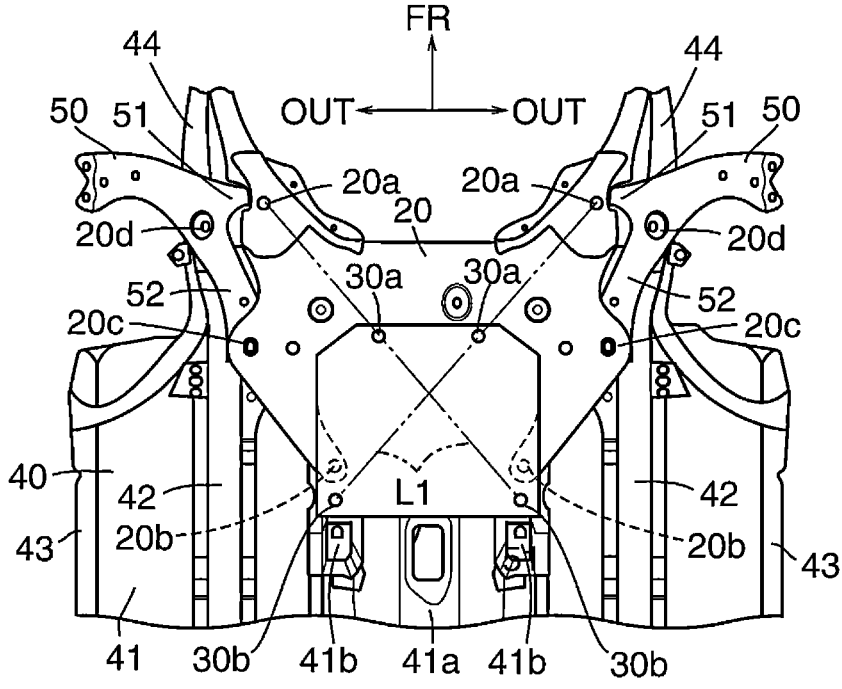
FIG. 11 is a bottom view illustrating a modification of the vehicle body front structure according to the first embodiment of the present disclosure.
Figure 12:
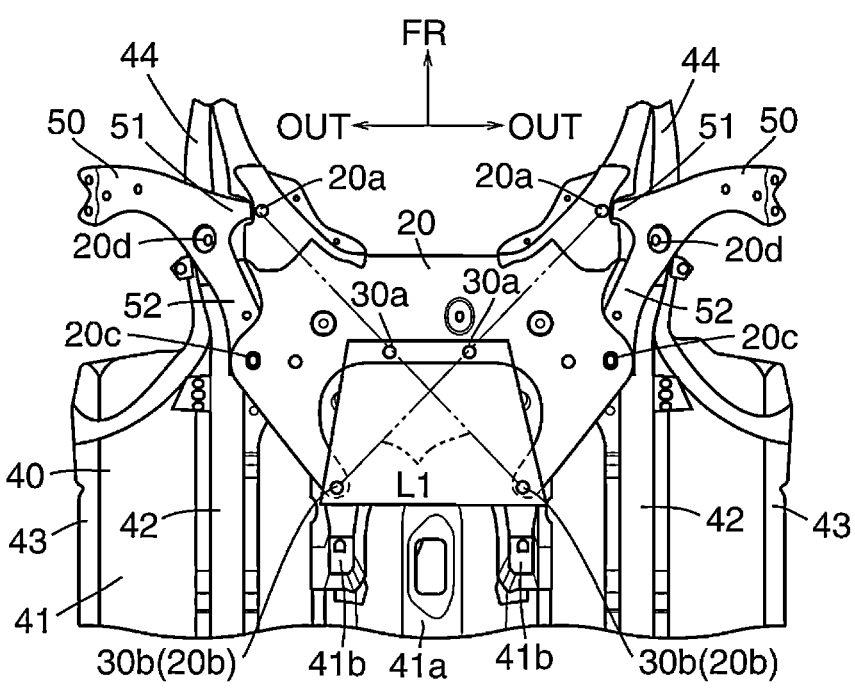
FIG. 12 is a bottom view showing a modification of the vehicle body front structure of the first embodiment.
Figure 13:
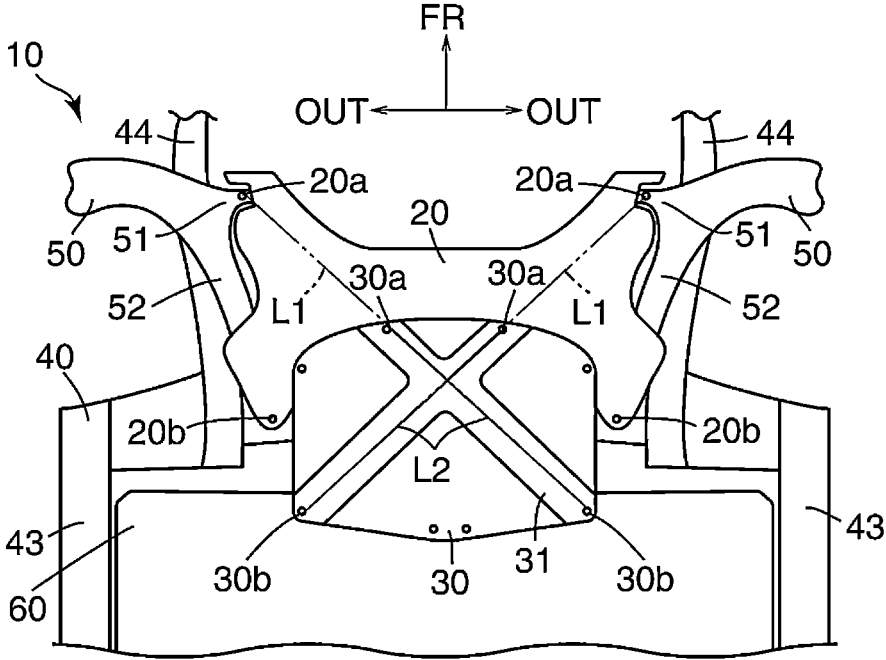
FIG. 13 is a bottom view of the vehicle body front structure of the embodiment 2.

Hereinafter, a vehicle body front structure 10 according to an embodiment of the present disclosure will be described with reference to the drawings. FIG. 1 to FIG. 12 show a front structure of a vehicle body according to a first embodiment of the present disclosure. FIG. 13 shows the vehicle body front structure of the second embodiment of the present disclosure. In each embodiment, the same or similar members are denoted by the same reference numerals. In the drawings, FR indicates the front side of the vehicle body, and OUT indicates the outer side in the vehicle body widthwise direction.

Example 1 (FIG. 1 to FIG. 12)

Figure 1:
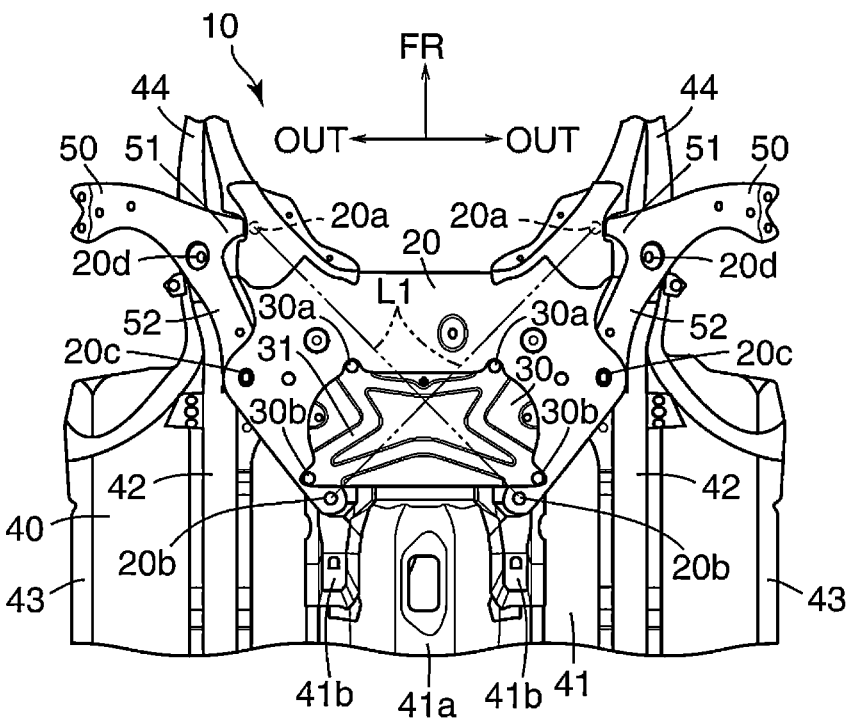
FIG. 1 is a bottom view of a vehicle body front structure according to a first embodiment of the present disclosure.

The vehicle body front structure 10 is substantially symmetrical with respect to the center in the vehicle body width direction. As shown in FIG. 1, the vehicle body front structure 10 includes a subframe 20 and an undercover 30.

The subframe 20 (which may be referred to as a front suspension member) is supported by the shell body 40.

A left and right lower arm 50 for rotatably supporting a knuckle (both not shown) for holding a wheel is connected to the subframe 20. The subframe 20 includes left and right frame front-side connecting portions 20a connected to the front-side arm portions 51 of the left and right lower arms 50, and left and right frame rear-side connecting portions 20b located on the rear side of the vehicle body from the frame front-side connecting portion 20a. The subframe 20 further includes left and right frame first intermediate connection portions 20c, which are located between the frame front-side connection portion 20a and the frame rear-side connecting portion 20b in the vehicle body front-rear direction and are connected to the rear-side arm portions 52 of the left and right lower arms 50, and left and right frame second intermediate connection portions 20d, which are located between the frame front-side connection portion 20a and the frame first intermediate connection portion 20c in the vehicle body front-rear direction and are connected to the front underreinforcements 44 of the shell body 40.

The frame front connecting portion 20a receives a main lateral direction (vehicle body width direction) from the lower arm 50. The rigidity of the attachment point of the frame front connecting portion 20a greatly contributes to the steering stability. The frame rear-side connecting portion 20b is connected to the shell body 40.

Figure 2:
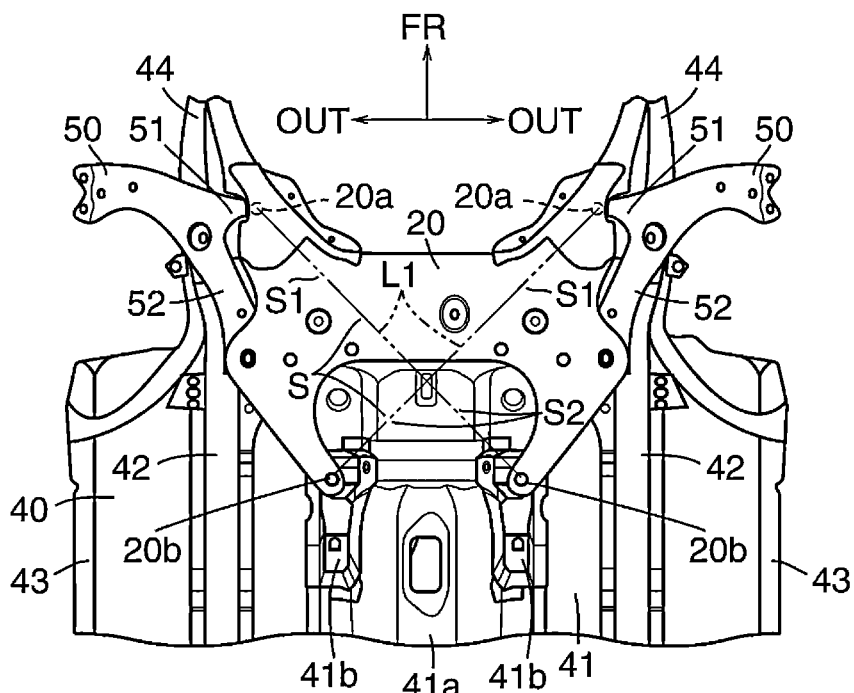
FIG. 2 is a bottom view of FIG. 1 with an undercover omitted.

The undercover 30 is disposed at the rear of the subframe 20. As shown in FIGS. 1 and 2, in a bottom view, a diagonal line of a quadrangle having a frame front-side connecting portion 20a and a frame rear-side connecting portion 20b as a top portion, and a diagonal line of a quadrangle having a frame front-side connecting portion 20a and a cover rear-side connecting portion 30b as a top portion, an undercover 30 including an area S on a first diagonal line L1 which is a long diagonal line is provided. In the area S, there are an area part S1 in which the subframe 20 is provided in a bottom view and an area part S2 in which the subframe 20 is not provided. The undercover 30 includes an area part S2 in which the subframe 20 is not provided. Incidentally, the area part S2 in which the subframe 20 is not provided, although the subframe 20 is provided, when the subframe 20 has a portion such as a U-shape, a V-shape, or a U-shape in the upper side and has a low rigidity in the left-right direction, it may be the curved portion (the low rigidity portion).

The undercover 30 is provided mainly for improving aerodynamic characteristics by allowing the traveling wind flowing below the vehicle body to flow smoothly toward the rear of the vehicle body, but is also provided for load transmission. Therefore, the undercover 30 is made of, for example, iron, aluminum, CFRP, or the like, and has a higher rigidity than when it is made considering only aerodynamic properties.

The undercover 30 includes left and right cover front-side connecting portions 30a connected to the subframe 20, and left and right cover rear-side connecting portions 30b located on the rear side of the vehicle body from the cover front-side connecting portion 30a.

The cover front-side coupling portion 30a and the cover rear-side coupling portion 30b are set in the vicinity of the first diagonal line L1 or the first diagonal line L1 when viewed from the bottom. Note that the neighborhood on the first diagonal line L1 is a position closest to the first diagonal line L1 among the positions at which the connecting portion 30a and/or the cover rear connecting portion 30b can be set when the seat shape or the like is present on the first diagonal line L1 and the setting of the cover front connecting portion and/or the cover rear connecting portion 30a, 30b is difficult. The neighborhood on the first diagonal line L1 is within a range of about 10 cm or less from the first diagonal line L1.

Figure 3:
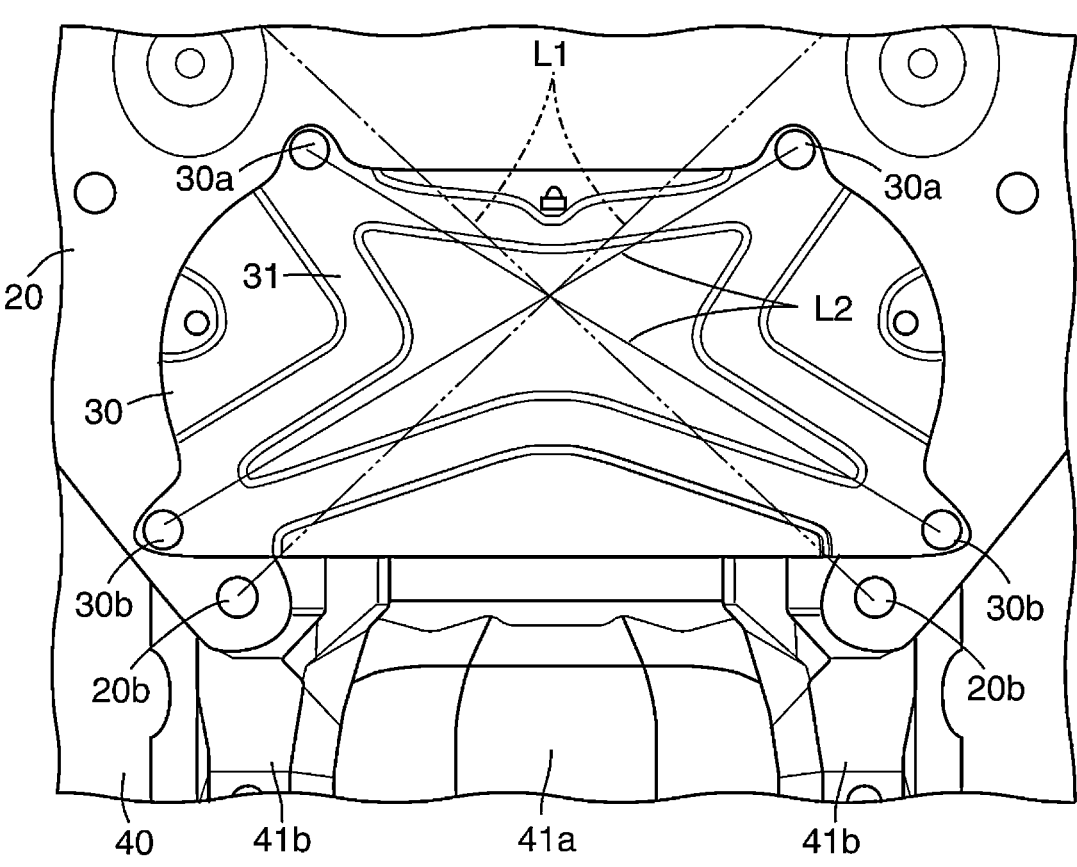
FIG. 3 is an enlarged bottom view of the undercover of FIG. 1 and its vicinity.
Figure 4:
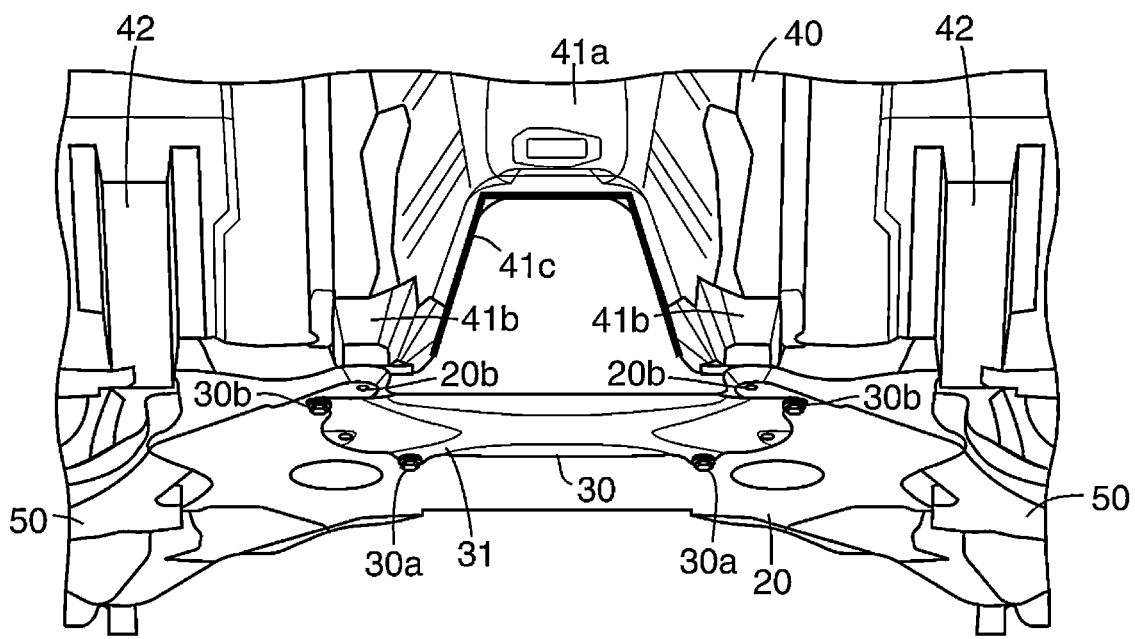
FIG. 4 is a perspective view of the vehicle body front structure of the first embodiment of the present disclosure as viewed from the rear and lower side of the vehicle body.
Figure 9:
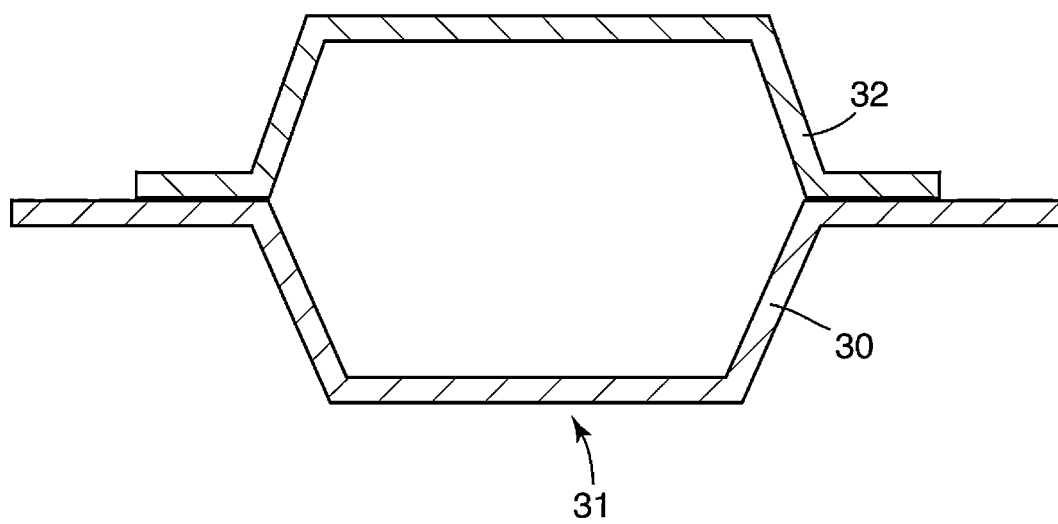
FIG. 9 is an enlarged cross-sectional view of VIII-VIII line portion of FIG. 7, showing a modification of the vehicle body front structure of the first embodiment.
Figure 10:
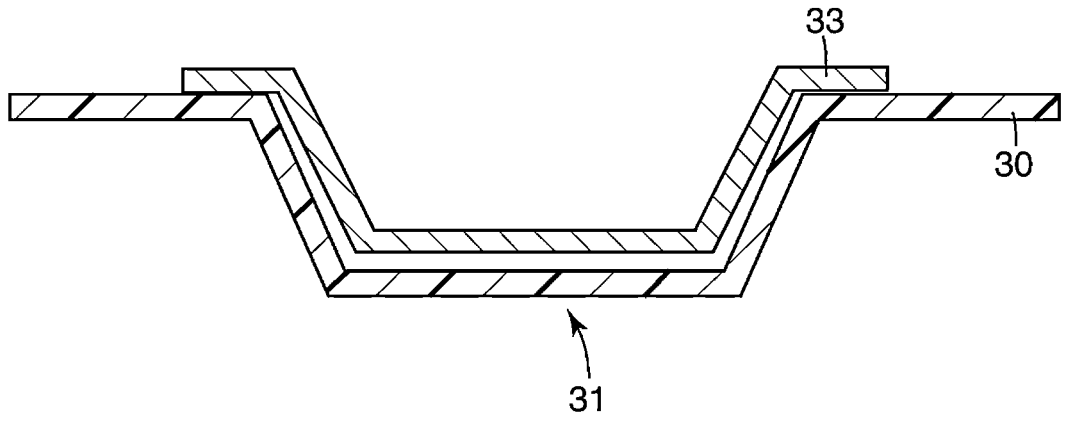
FIG. 10 is an enlarged cross-sectional view of VIII-VIII line portion of FIG. 7, showing a modification of the vehicle body front structure of the first embodiment.

As shown in FIG. 3, the undercover 30 is provided with a reinforcing portion 31 extending over the entire area on a second diagonal line L2 which is a diagonal line of a quadrangle with the cover front-side connecting portion 30a and the cover rear-side connecting portion 30b as top portions. Preferably, the reinforcing portion 31 extends continuously over the entire area in the second diagonal line L2. When the undercover 30 is a one-piece structure, the reinforcing portion 31 is formed of, for example, a bead formed in the undercover 30 (see FIG. 8). However, when the undercover 30 is not limited to a one-piece configuration, (i) as shown in FIG. 9, it may be formed a reinforcing portion 31 closed cross-sectional using a separate panel member 32 in the bead formed in the undercover 30, as shown in (ii) FIG. 10, the bead along the bead formed in the undercover 30 may be formed in a separate panel member 33, and the both beads may be overlapped to form the reinforcing portion 31. When (ii), the undercover 30 may be made of a resin having a relatively light specific gravity to satisfy aerodynamic performance, and the panel member 33 may be made of a metal such as iron, aluminum, or CFRP having a Young's modulus higher than that of the resin. The above configuration is applicable not only to the first embodiment but also to the second embodiment.

In the first embodiment of the present disclosure, in addition to the above configuration, the following configuration is further provided.

As illustrated in FIG. 1, the shell body 40 includes a floor panel 41 in which a tunnel portion 41*a* extending in the vehicle body front-rear direction is provided at a center portion in the vehicle body widthwise direction, and left and right underreinforcements 42 extending in the vehicle body front-rear direction on both left and right outer sides of the tunnel portion 41*a* and forming a main skeleton of the shell body 40 by forming a closed cross-sectional configuration with the floor panel 41 disposed on the lower side of the floor panel 41. The shell body 40 also includes a rocker 43 extending in the vehicle body front-rear direction at both end portions in the vehicle body width direction of the floor panel 41 and forming the skeleton of the shell body 40, and a front under-lean force 44 extending from the floor panel 41 toward the front of the vehicle body so as to be connected to the under-lean force 42. The floor panel 41 is provided with body floating island portions 41*b* on both left and right sides of the tunnel portion 41*a* so as to bulge downward.

Among the frame rear-side connecting portion 20*b* and the cover rear-side connecting portion 30*b*, the connecting portion on the first diagonal line L1 is connected to the shell body 40 at positions on the left and right sides of the tunnel portion 41*a* and on the center side in the vehicle body widthwise direction from the left and right under-lean forces 42, avoiding a portion forming the skeleton of the shell body 40. Of the frame rear-side connecting portion 20*b* and the cover rear-side connecting portion 30*b*, the connecting portion on the first diagonal line L1 is connected to the floor panel 41 via the body floating island portion 41*b*.

In FIG. 1 to FIG. 4, the cover-rear-side connecting portion 30*b* is connected to the subframe 20, and the frame-rear-side connecting portion 20*b* is on the first diagonal line L1. However, as shown in FIG. 11, the cover rear-side connecting portion 30*b* may be connected to the shell body 40 at a position closer to the vehicle body rear side than the frame rear-side connecting portion 20*b* (the body floating island portion 41*b*), and the cover rear-side connecting portion 30*b* may be on the first diagonal line L1. Further, as shown in FIG. 12, the cover rear-side connecting portion 30*b* is coupled to the frame rear-side connecting portion 20*b* and the shell body 40 (body floating island portion 41*b*) by being fastened together, and the frame rear-side connecting portion 20*b* and the cover rear-side connecting portion 30*b* may both be on the first diagonal line L1.

As described above, the connecting portion on the first diagonal line L1 of the frame rear-side connecting portion 20*b* and the cover rear-side connecting portion 30*b* is connected not to the shell body skeleton but to the body floating island portions 41*b* on the left and right sides of the tunnel portion 41*a*. This is to reduce the transmission oscillation of the road noise and improve NV. However, the rigidity of the attachment point of the frame front-side coupling portion 20*a* receiving the lower arm 50 is reduced. On the other hand, by setting the undercover 30, the rigidity of the attachment point of the frame front-side connecting portion 20*a* is improved. The effects and mechanisms of this structure will now be described.

Figure 5:
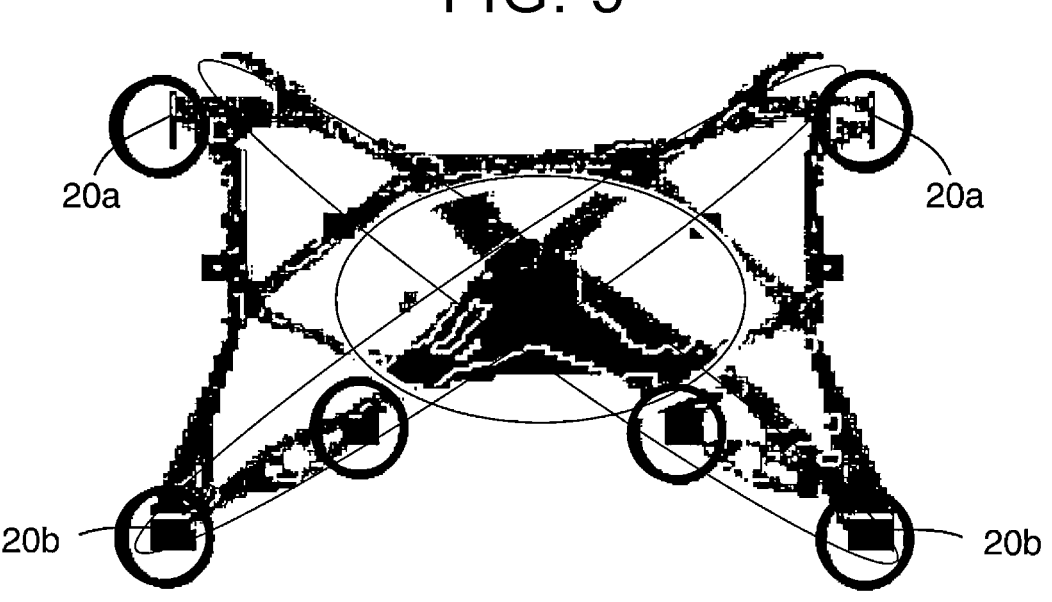
FIG. 5 is a plan view showing a topology analysis result of a subframe in the vehicle body front structure according to the first embodiment of the present disclosure.

FIG. 5 is a plan view showing a result of performing topology analysis on the subframe 20. In the topology analysis, it is possible to know an efficient area by arranging a member in order to increase a target variable such as a rigidity value with respect to an input of a load. In FIG. 5, it can be seen from the frame front-side connecting portion 20*a* which is a connecting point (fastening point) of the lower arm 50 to the subframe 20 that the member remains diagonally with respect to the connecting portion on the first diagonal line L1 of the frame rear-side connecting portion 20*b* and the cover rear-side connecting portion 30*b*. From this, it can be seen that when the member is disposed obliquely toward the connecting portion on the farthest first diagonal line L1 when the pitch is wider than the frame front-side connecting portion 20*a* which receives the large input, it is efficient. Referring to FIG. 2 in which the undercover 30 is omitted, in the subframe 20, there is an area part S2 in which there is no member on the first diagonal line L1 in the area S. This stiff area part S2 is filled with an undercover 30. The undercover 30 is made of a material and a structure having relatively high rigidity to be subjected to shear, so that not only the aerodynamic performance but also the rigidity function is provided.

Next, the "connection (fastening) position of the undercover 30" which is an element for efficiently exhibiting the improvement in the rigidity of the attachment point of the frame front-side connection portion 20*a* will be described.

Figure 6:
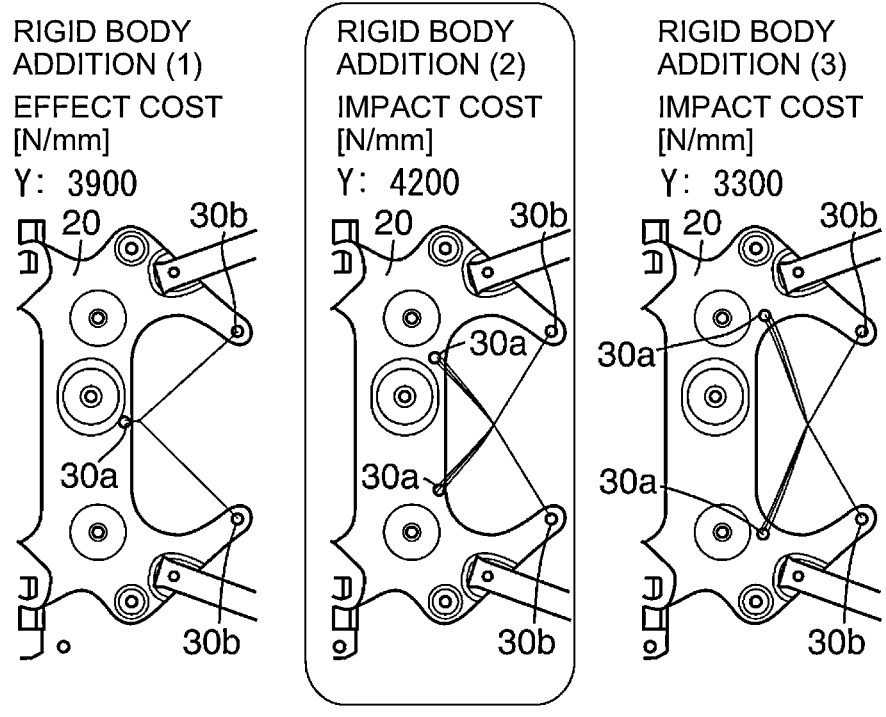
FIG. 6 is a bottom view showing a result of rigidity analysis in which three types of positions of the cover front connecting portions of the undercover in the vehicle body front structure of the first embodiment of the present disclosure are different.

FIG. 6 shows the stiffness analysis when the cover rear-side connecting portion 30*b* is disposed on the first diagonal line L1 and the connecting positions of the cover front-side connecting portion 30*a* are changed. It can be seen that the arrangement indicated by "rigid body addition 2" has the highest value of the target variable "Y". This indicates that the rigidity increases as the undercover 30 is connected at a position close to the first diagonal line L1. According to the present disclosure, the second diagonal line L2, which is a diagonal line of a quadrangle having the cover front-side connecting portion 30*a* and the cover rear-side connecting portion 30*b* as the top portions, is positioned on the first diagonal line L1 or close to the first diagonal line L1. In FIG. 3, the second diagonal line L2 is located close to the first diagonal line L1. Ideally, the first diagonal line L1 is the most efficient, but in the embodiment, it is provided at a position slightly offset from the first diagonal line L1 from the relation with the seating configuration of the periphery, etc., but is sufficiently obtained as an advantage.

Next, the "reinforcing structure of the undercover 30" which is an element for efficiently exhibiting the improvement in the rigidity of the attachment point of the frame front-side coupling portion 20*a* will be described.

Figure 7:
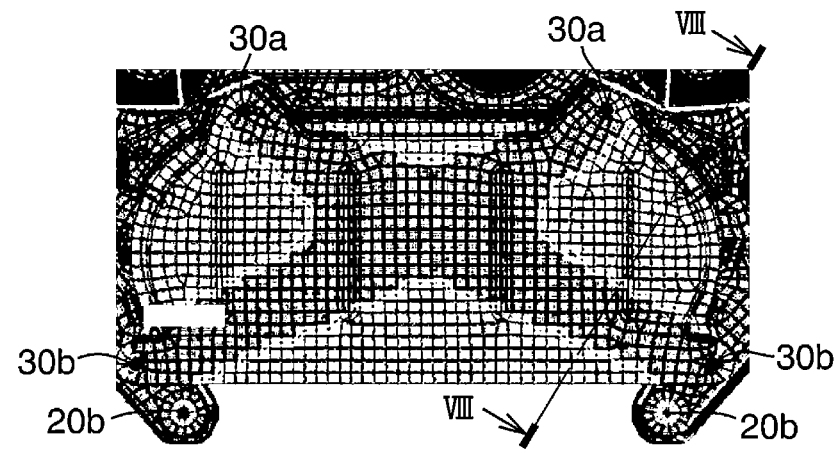
FIG. 7 is a plan view showing a topology analysis result of the undercover in the vehicle body front structure according to the first embodiment of the present disclosure.
Figure 8:
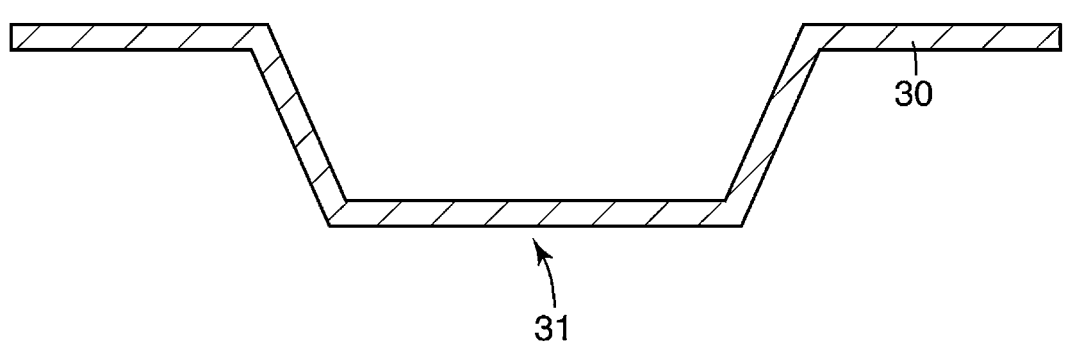
FIG. 8 is an enlarged sectional view taken along VIII-VIII line of FIG. 7.

FIG. 7 is a plan view showing a result of the topology analysis performed on the undercover 30. It can be seen that a member (colored area) remains in such a manner as to diagonally connect the connection positions of the undercover 30 determined in the previous paragraph, and the efficiency is improved as the area is reinforced. In order to provide aerodynamic performance, an undercover 30 is shown in FIG. 3, in which an area having low efficiency in rigidity is also left as a member. As shown in FIG. 3, the undercover 30 is provided with a reinforcing portion 31 extending over the entire area on the second diagonal line L2. In the case where the reinforcing portion 31 is formed of a bead, the bead may have a diagonal pattern of two steps with a step on not only the outer side of the bead but also the inner side surrounded by the bead in order to suppress twisting of the undercover 30. Even in this pattern, a sufficient value is obtained as an effect.

Finally, the integration of tunnel brace functions is described.

In a typical shell body, the opening 41c of the tunnel portion 41a becomes a weak point of stiffness. In order to reinforce this weak portion, in order to suppress the opening of the front end portion of the tunnel portion 41a, it is conceivable to provide a tunnel brace (not shown) connecting the left and right sides of the tunnel portion 41a, but the number of components is increased. However, in the present disclosure, as shown in FIGS. 1 and 3, on both left and right sides of the front end portion of the tunnel portion 41a, a connecting portion 20b (or 30b) on the first diagonal line L1 is provided, and a connecting portion 30b (or 20b) is set in the vicinity of the connecting portion 20b (or 30b). For this reason, the undercover 30 serves to suppress the opening of the opening 41b of the tunnel portion 41a that the tunnel brace is responsible for.

Next, effects of the first embodiment of the present disclosure will be described.

(A) In order to increase the stiffness of the frame front connecting portion 20a (the attachment point of the subframe 20) with respect to the large input from the lower arm 50, it is desirable that the member is disposed obliquely on the (a) first diagonal line L1. In addition, it is preferable that (b) the cover front-side coupling portion 30a and the cover rear-side coupling portion 30b are set on the first diagonal line L1. Furthermore, it is preferable that (c) the undercover 30 is reinforced on a diagonal line connecting the cover front-side connecting portion 30a and the cover rear-side connecting portion 30b.

In the present disclosure, since the undercover 30 is provided including the area S on the first diagonal line L1 in the bottom view, the members can be arranged in cooperation between the subframe 20 and the undercover 30 in the first diagonal line L1.

Further, the cover front-side coupling portion 30a and the cover rear-side coupling portion 30b are located on the first diagonal line L1 or in the vicinity of the first diagonal line L1. Furthermore, the undercover 30 is provided with a reinforcing portion 31 extending on a second diagonal line L2 which is a diagonal line of a quadrangle with the cover front-side connecting portion 30a and the cover rear-side connecting portion 30b as top portions. Therefore, the rigidity of the frame front connecting portion 20a can be increased.

In this structure, unlike the conventional structure, since it is not necessary to provide an additional component different from the undercover 30, it is possible to eliminate an increase in the number of components due to the additional component and an occupation of space due to the additional component.

(B) When the undercover 30 is a one-piece component, the number of components can be reduced as compared with a case where the undercover 30 is a multiple-part component. Further, since the reinforcing portion 31 is formed of a bead formed in the undercover 30, the reinforcing portion can be easily provided without requiring a separate component.

The effects (A) and (B) described above are also applicable to the second embodiment of the present disclosure.

(C) Among the frame rear-side connecting portion 20b and the cover rear-side connecting portion 30b, the connecting portion on the first diagonal line L1 is connected to the shell body 40 at a position on the left and right sides of the tunnel portion 41a and on the center side in the vehicle body width direction from the left and right under-lean forces 42 in the vehicle body width direction, avoiding a portion forming the skeleton of the shell body 40, and thus is connected to a portion which is softer than a portion forming the hard main skeleton of the shell body 40, such as the under-lean force 42. This makes it difficult for the road noise transmitted from the tire to be transmitted to the floor panel 41, which is advantageous in terms of NV performance.

Example 2 (FIG. 13)

(Background) In BEV vehicles developed and put on the market in order to promote carbon neutral, a large battery (battery pack) is generally set on the lower surface of a floor panel of a vehicle body. In many cases, a connector for coupling a high-voltage wiring is provided in front of a vehicle body of a battery. In this case, in order to protect the connector from interference with falling objects on the road surface, a battery connector protective plate is often used in which the front surface of the battery and the lower surface of the subframe are covered with a thick iron plate.

In addition, in BEV vehicle, the noise of the engine becomes quieter due to the lack of the engine noise, but there is a problem that the user becomes more sensitive to noise such as road noise hidden in the engine noise. Therefore, NV performance needs to be improved more than that of an engine-driven vehicle.

Further, in BEV vehicle, the vehicle weight tends to be relatively heavy with respect to the engine vehicle, but this lowers the steering stability (although it is advantageous in the roll reduction effect due to the lower center of gravity, the yaw response is reduced due to the increase in the inertial mass). Therefore, in order to satisfy the needs of the user who has been familiar with the engine vehicle, it is necessary to further improve the steering stability. In the automatic driving control, good responsiveness of the vehicle response to the operation of the steering actuator, linearity of the response, and good convergence are important factors in emergency avoidance and natural movement.

As described above, a battery connector protective plate is required in BEV. In order to improve the performance of BEV and autonomous driving, improvement of NV and maneuverability is a key factor. As a means to solve these problems in an integrated manner, the structural idea of the rigid undercover 30 proposed in the first embodiment of the present disclosure is developed to provide a rigid undercover having the function of a battery connector protective plate.

In the second embodiment, the vehicle to which the vehicle body front structure 10 is applied is a BEV, PHEV or the like in which a large battery is set. The battery 60 is disposed below the floor panel 41 of the shell body 40.

The frame rear-side connecting portion 20b is connected to the shell body in order to improve NV performance, avoiding a portion forming the main skeleton of the shell body 40. The frame rear-side connecting portion 20b is connected to the shell body at the front side of the vehicle body from the battery 60. The cover-rear-side connection portion 30b is connected to the front lower surface of the battery 60. For this reason, instead of the frame rear-side connecting portion 20b, the cover rear-side connecting portion 30b is located on the first diagonal line L1.

In the second embodiment of the present disclosure, in addition to the effects (A) and (B) described in the first embodiment of the present disclosure, the following effects can be further obtained.

(D) Since the cover rear-side connecting portion 30b is connected to the battery 60, the front of the vehicle body of the battery 60 can be covered with the undercover 30 from below. Therefore, in a BEV, a PHEV, or the like in which the battery 60 is mounted, a connector (not shown) provided in front of the vehicle body of the battery 60 can be protected from falling objects on the road surface by the undercover 30 provided for improving aerodynamic properties. This structure eliminates the need for a battery connector protection plate that is provided only to protect the connector. Then, the number of parts can be reduced.

What is claimed is:

1. A vehicle front part structure comprising:
a subframe including right and left frame front side connecting portions connected to right and left lower arms, and right and left frame rear side connecting portions located on a vehicle body rear side from the frame front side connecting portions and connected to a shell body; and
an undercover disposed at a rear part of the subframe, the undercover including right and left cover front side connecting portions connected to the subframe, and right and left cover rear side connecting portions located on the vehicle body rear side from the cover front side connecting portions and connected to a battery fixedly attached to the subframe, the shell body, or a corresponding shell body, wherein
when viewed from a bottom, the undercover is provided including an area on a first diagonal line that is a longer diagonal line among a diagonal line of a quadrangle with the frame front side connecting portions and the frame rear side connecting portions as vertices and a diagonal line of a quadrangle with the frame front side connecting portions and the cover rear side connecting portions as vertices,
the cover front side connecting portions and the cover rear side connecting portions are located on the first diagonal line or in a vicinity of the first diagonal line, and the undercover is provided with a reinforcing portion extending on a second diagonal line that is a diagonal line of a quadrangle with the cover front side connecting portions and the cover rear side connecting portions as vertices.

2. The vehicle front part structure according to claim 1, wherein:
in the area on the first diagonal line, there are an area portion in which the subframe is provided and an area portion in which the subframe is not provided; and
the undercover is provided including the area portion in which the subframe is not provided.

3. The vehicle front part structure according to claim 1, wherein:
the undercover is a one-piece configuration; and
the reinforcing portion is composed of a bead provided in the undercover.

4. The vehicle front part structure according to claim 1, wherein:
the shell body includes a floor panel provided with a tunnel portion extending in a vehicle body front-rear direction at a center portion in a vehicle body width direction, and right and left underreinforcements that extends in the vehicle body front-rear direction at both right and left outer sides of the tunnel portion and that is disposed on a lower side of the floor panel to provide a closed cross-sectional structure with the floor panel to provide a main skeleton of the shell body; and
among the frame rear side connecting portions and the cover rear side connecting portions, connecting portions on the first diagonal line are connected to the shell body at a position on right and left sides of the tunnel portion and on a center side in the vehicle body width direction from the right and left underreinforcements, while avoiding a portion providing a skeleton of the shell body.

5. The vehicle front part structure according to claim 1, wherein:
the shell body includes a floor panel;
the battery is disposed below the floor panel; and
the cover rear side connecting portions are connected to the battery.

* * * * *